Sept. 27, 1938.  W. C. STREGE  2,131,647
PORTABLE BASE
Filed Oct. 4, 1937
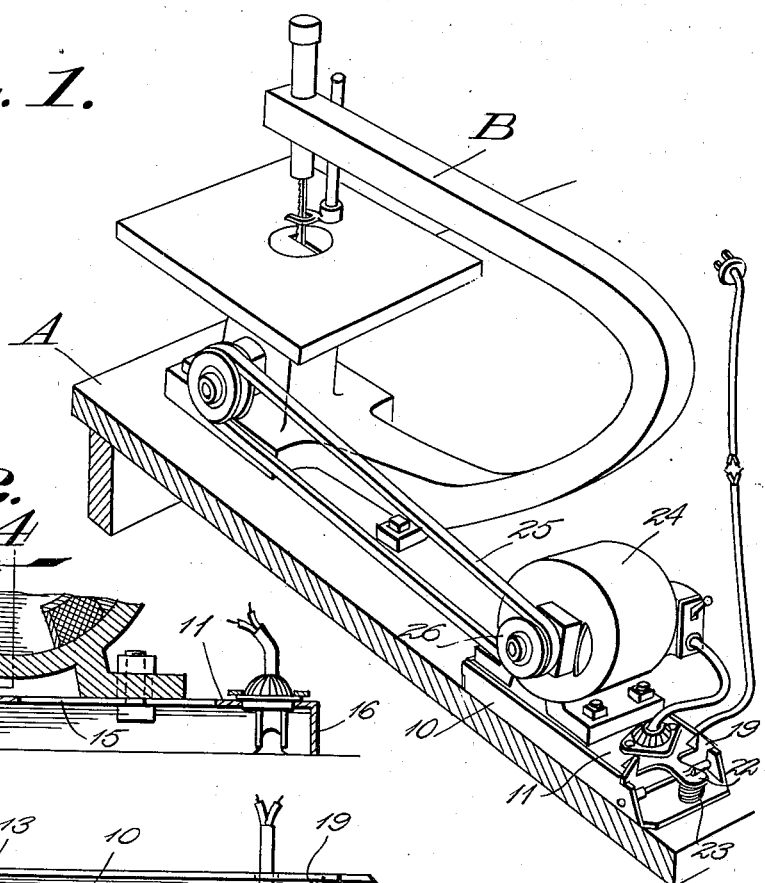
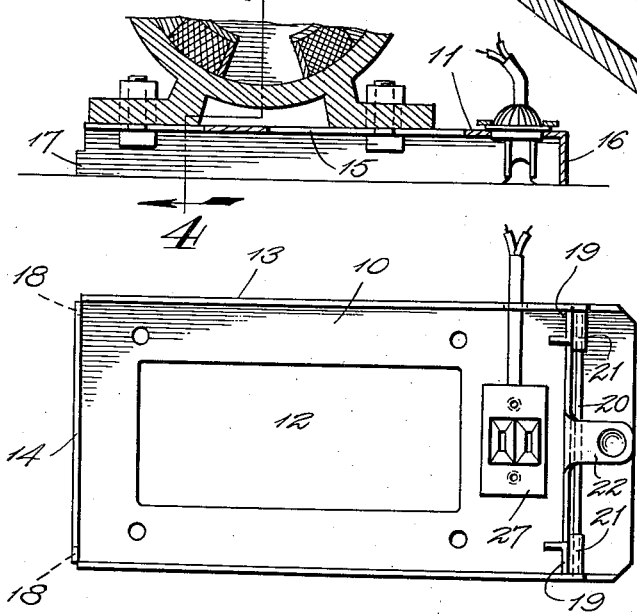
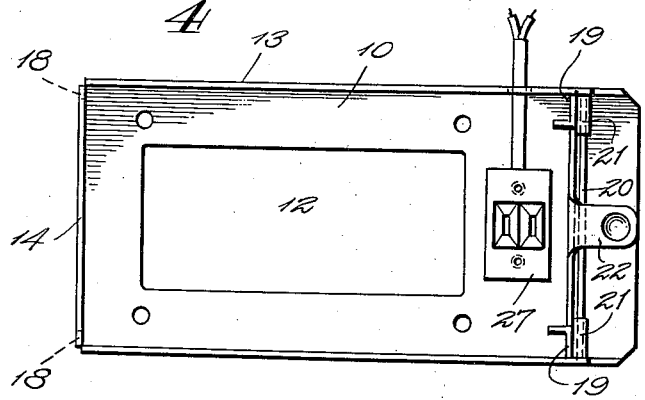
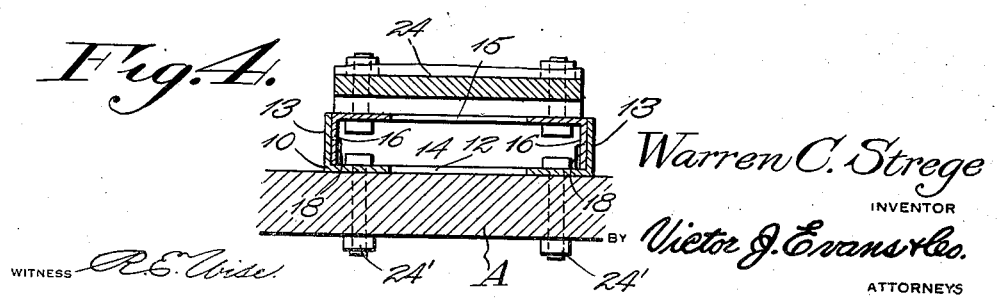
Warren C. Strege
INVENTOR
BY Victor J. Evans & Co.
ATTORNEYS Patented Sept. 27, 1938

2,131,647

UNITED STATES PATENT OFFICE 2,131,647

PORTABLE BASE

Warren Charles Strege, Madison, Minn.

Application October 4, 1937, Serial No. 167,319

1 Claim. (Cl. 248—19)

The invention relates to a portable base and more particularly to a portable base for electric motors.

The primary object of the invention is the provision of a base of this character, wherein an electric motor can be conveniently fastened in place for proper association with machinery to be driven thereby, the base being of novel construction and is portable.

Another object of the invention is the provision of a base of this character, wherein the same is made of two sections, the upper section being latched to the lower section and said upper section is adapted to have fastened thereto an electric motor for driving machinery while in association with these sections is a plug switch which is susceptible of automatic operation in the connection of the motor with the source of current supply and disconnection of the same.

A further object of the invention is the provision of a base of this character, which is simple in construction, thoroughly reliable and effective in operation, light in weight yet strong, durable, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a fragmentary perspective view of a work bench showing the base constructed in accordance with the invention applied and having an electric motor mounted thereon for driving a jig sawing machine.

Figure 2 is a fragmentary vertical longitudinal sectional view through upper section of the base and motor.

Figure 3 is a top plan view of the bottom section of the base.

Figure 4 is a sectional view on the line 4—4 of Figure 2 looking in the direction of the arrows.

Similar reference characters indicate corresponding parts throughout the several views in the drawing.

Referring to the drawing in detail, A designates a portion of a work bench or other like support while bolted or otherwise secured thereon is a machine B, in this instance a jig sawing machine of a standard construction. This support A is adapted to carry the portable base constituting the present invention and hereinafter fully described.

The portable base comprises a lower foundation section 10 and an upper interfitted separable section 11, these sections in this instance are preferably made from aluminum although the same may be made from any other suitable material. The lower section 10 is formed with a flat body portion having preferably an open center 12 while upstanding from opposite longer sides are the vertical side walls 13, one end of the said section being open while the opposite end is closed by an upstanding vertical end wall 14.

The upper section 11 is preferably provided with an open center 15 and at three edges thereof are downturned flanges 16, these being at one end and at the opposite longer sides thereof. This upper section 11 at the remaining open end thereof is formed with lugs 17 to be accommodated in slots 18 provided in the closed end or the end wall 14 of the lower section 10. The upper section 11 is telescopically insertable in the lower section 10 and the closed end of this upper section has engageable therewith a double-pronged latch 19 vertically swingable upon a pivot 20 journaled in the sides 13 of the lower section 10, the latch 19 being provided with pintle eyes 21 receiving the pivot 20 while centrally of this latch is a depressible ear 22 engageable by a spring 23 urging said latch 19 to latching position with the upper section 11 when fitted within the lower section 10. In this manner the upper section 11 is separable from the lower section 10. The upper section has bolted or otherwise made secure thereto an electric motor 24 while the lower section 10 is bolted or otherwise made fast at 24' to the support A. The motor 24 through the connections 25 and 26 operates or drives the machine B.

The lower section has fitted therein an electric plug socket fitting 27 while the upper section carries an electric plug fitting 28 and in this manner separable electrical connection between the motor 24 and a feed current wire cable 29 is had. When the upper section 11 is separated from the lower section 10, the connection is automatically disengaged, that is, the plug 28 from the socket 27. Thus on separating the section 11 from the section 10 the motor 24 with the section 11 attached thereto is readily portable.

The lugs 17 cooperate with the latch 19 in separably fastening the upper section 11 in the lower section 10, these constituting the base for the motor.

What is claimed is:

A base of the kind described comprising a lower foundation section provided with a bottom, sides, one end wall and an opposite open end, an upper supporting section for fitting within said foundation section and having a top, sides, one end wall and an opposite open end, lugs projecting from the sides of the upper supporting section at its open end and engageable in clearances in the end wall of the foundation section, and a hand-releasable latch fitted with the foundation section and engageable with the upper supporting section at two points thereof for the retention of the lugs in the clearances and holding the said sections separably interfitted with each other, the end walls of the said sections being in closing relation to the opposite open ends thereof when the sections are interfitted with each other.

WARREN CHARLES STREGE.